(12) United States Patent
Neuman et al.

(10) Patent No.: US 7,697,074 B2
(45) Date of Patent: Apr. 13, 2010

(54) SYSTEM AND METHOD FOR VIDEO PROCESSING DEMONSTRATION

(75) Inventors: Darren Neuman, Palo Alto, CA (US);
Brian F. Schoner, Fremont, CA (US)

(73) Assignee: Broadcom Corporation

( * ) Notice: Subject to any disclaimer, the term of this patent is extended or adjusted under 35 U.S.C. 154(b) by 1101 days.

(21) Appl. No.: 11/349,630

(22) Filed: Feb. 8, 2006

(65) Prior Publication Data
US 2007/0182857 A1 Aug. 9, 2007

(51) Int. Cl.
*H04N 5/50* (2006.01)
(52) U.S. Cl. .................................................. 348/607
(58) Field of Classification Search .................. None
See application file for complete search history.

(56) References Cited
U.S. PATENT DOCUMENTS

| | | | | |
|---|---|---|---|---|
| 6,449,061 B2 * | 9/2002 | Metcalfe | .................... | 358/3.05 |
| 6,724,437 B2 * | 4/2004 | Funke et al. | ................. | 348/622 |
| 7,002,594 B2 * | 2/2006 | Yoshida et al. | .............. | 345/600 |
| 7,382,383 B2 * | 6/2008 | Shiomi et al. | ............... | 345/690 |
| 7,391,823 B2 * | 6/2008 | Shibusawa | ................... | 375/316 |
| 7,428,018 B2 * | 9/2008 | Kim et al. | .................... | 348/564 |
| 7,432,986 B2 * | 10/2008 | Winger | ........................ | 348/625 |
| 2001/0026283 A1 * | 10/2001 | Yoshida et al. | .............. | 345/600 |
| 2007/0047658 A1 * | 3/2007 | Tourapis et al. | ........ | 375/240.25 |
| 2007/0160285 A1 * | 7/2007 | Gondek et al. | .............. | 382/162 |

* cited by examiner

*Primary Examiner*—Paulos M Natnael
(74) *Attorney, Agent, or Firm*—McAndrews, Held & Malloy, Ltd.

(57) ABSTRACT

Systems and methods for processing a video signal are disclosed and may include degrading a received video signal utilizing one or more of a plurality of video signal degrading methods. The degraded video signal may be processed to generate an improved video signal. At least a portion of the degraded video signal and a corresponding portion of the improved video signal may be displayed. Random noise may be added to the received video signal to generate the degraded video signal. Noise within the degraded video signal may be reduced to generate the improved video signal utilizing digital noise reduction and/or analog noise reduction. The received video signal may be compressed and decompressed to generate the random noise. The received video signal may be softened to generate the degraded video signal. The degraded video signal may be sharpened to generate the improved video signal.

6 Claims, 8 Drawing Sheets

SYSTEM AND METHOD FOR VIDEO PROCESSING DEMONSTRATION

CROSS-REFERENCE TO RELATED APPLICATIONS/INCORPORATION BY REFERENCE

This application makes reference to:
U.S. application Ser. No. 11/087,491, filed on Mar. 22, 2005; and
U.S. application Ser. No. 11/090,642, filed on Mar. 25, 2005.

Each of the above stated applications is hereby incorporated herein by reference in its entirety.

FIELD OF THE INVENTION

Certain embodiments of the invention relate to processing of video signals. More specifically, certain embodiments of the invention relate to a system and method for video processing demonstration.

BACKGROUND OF THE INVENTION

Digital television, popularly referred to as DTV, is an enhanced television system capable of transmitting and receiving digitized signals, displaying digital images and playing digital audio. While some of these features may be present in current analog television systems such as national television standards committee (NTSC), SEquential Couleur Avec Memoire (SECAM) and Phase Alternate Line (PAL), the combination of digitized transmission, reception, video and audio distinguishes digital television from current analog television systems.

Digital television employs various digital signal processing techniques and utilizes scarce bandwidth in a more spectrally efficient manner to transport and present audio and video signals in a way that is superior to current analog television systems. In this regard, digital television allows more channels containing more information to be broadcasted within an equivalent bandwidth utilized by current analog television systems. Accordingly, any excess bandwidth can be re-allocated for use by other types of communication systems. Broadcasters utilizing digital television systems are therefore, capable of providing over-the air television signals containing higher picture resolutions than current analog broadcast television systems Broadcasters utilizing digital television systems may also have the capability to provide multicasting and datacasting services using the same bandwidth allocated for conventional analog television systems. For these reasons, Congress mandated that current broadcast television service must, in time, be completely converted to digital television. While digital television (DTV) utilizes the same broadcast very high frequency (VHF) spectral band and ultra-high frequency spectral (UHF) band as conventional television broadcasting systems, digital television utilizes different modulation techniques than conventional analog television broadcasting systems. Conventional analog television broadcasting systems modulate video using amplitude modulation (AM) and the accompanying audio is modulated using frequency modulation (FM). DTV utilizes a plurality of modulation techniques for transmitting and receiving packetized digital signals. In the United States of America, an eight level vestigial sideband (VSB) modulation scheme is utilized. In some regions of Europe and Asia, for example, coded orthogonal frequency division multiplexing is the modulation scheme of choice. On the other hand, digital satellite systems (DSS) utilize quadrature phase shift keying, while cable television (CATV) system utilizes quadrature amplitude modulation (QAM).

In the United States, a plurality of broadcast formats promulgated by the Advanced Television Standards Committee (ATSC) has been adopted for DTV applications. Some of these formats comprise progressive-scan video comprising 480 scan lines referred to as 480p, interlaced 4:3 video having 480 scan lines referred to as 480i, interlaced video having 1080 scan lines referred to as 1080i and progressive-scan video having 720 scan lines referred to as 720p. Standard definition (SD) television (SDTV) utilizes the interlaced 480i and progressive 480p formats. The picture quality provided by SDTV is comparable in certain respects to conventional NTSC 525 lines systems. High definition (HD) television (HDTV) utilizes the interlaced 1080i and progressive 720p formats in 16:9 aspect ratio. The resolution of the HDTV interlaced 1080i and progressive 720p formats may be converted to lower resolution such as the interlaced 480i and progressive 480p formats provided by SDTV.

In the US for example, DTV signals are modulated on an RF carrier using 8-level VSB or 8VSB, and transmitted in a six (6) MHz channel as compressed 4:2:0 MPEG-2 formatted packetized streams. These packetized streams contain both audio and video information. For this reason, a conventional analog system is unable to receive a transmitted DTV signal. In order to decode a received 8-level VSB signal, an ATSC-compliant DTV receiver or a set-top box is required.

While broadcast television service is improving as it transitions to digital television format, television and video display manufacturers are also improving the display characteristics and quality of their products. For example, HDTV equipment with improved resolution and video processing capabilities are now being marketed from numerous manufacturers. Such HDTV equipment may implement various signal processing techniques that improve the display quality of the received signal. However, in instances when the input video signal is not significantly degraded, it may be difficult for an end user to distinguish between, and select which processing technique, or a combination of processing techniques, to use to improve the signal quality.

Modern televisions may be enabled to apply a variety of video signal processing techniques, such as sharpness adjustment, noise reduction, color adjustment, and/or ghost cancellation. However, unless the input video signal is deteriorated, it may be difficult for an end user to notice the effects of the video signal processing techniques.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for video processing demonstration, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a system and method for video processing demonstration. In one embodiment of the invention, a video processing demonstration method may comprise degrading a received video signal utilizing one of a plurality of video signal degrading methods. The degraded video signal may be processed to generate an improved video signal. At least a portion of the degraded video signal and a corresponding portion of the improved video signal may be displayed. Random noise may be added to the received video signal to generate the degraded video signal. Noise within the degraded video signal may be reduced to generate the improved video signal utilizing digital noise reduction and/or analog noise reduction. The received video signal may be compressed and/or decompressed to generate the random noise, and/or softened to generate the degraded video signal. The degraded video signal may be sharpened to generate the improved video signal. Flesh-tones within the received video signal may be corrupted to generate the degraded video signal. At least a portion of the corrupted flesh-tones within the degraded video signal may be corrected to generate the improved video signal. Ghost signals may be added within the received video signal to generate the degraded video signal. At least a portion of the added ghost signals within the degraded video signal may be canceled to generate the improved video signal.

Figure 1:
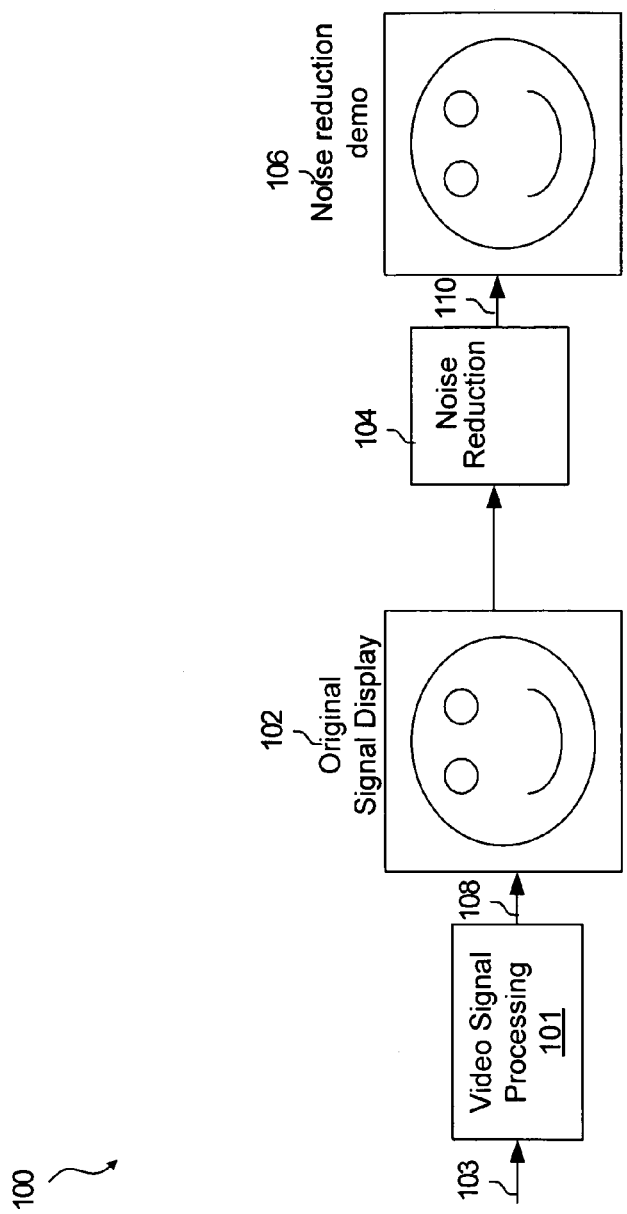
FIG. 1 is a block diagram of an exemplary system for video signal processing without signal deterioration, which may be used in accordance with an embodiment of the invention.

FIG. 1 is a block diagram of an exemplary system for video signal processing without signal deterioration, which may be used in accordance with an embodiment of the invention. Referring to FIG. 1, the exemplary system 100 for video signal processing may comprise an input signal processing block 101, displays 102 and 106, and a noise reduction block 104.

The input signal processing block 101 may comprise suitable circuitry, logic, and/or code and may enable initial processing of an input video signal 103. For example, the input signal processing block 101 may perform analog-to-digital conversion, demodulation, demultiplexing, and/or decoding of the received video signal 103. In addition, the input signal processing block 101 may enable additional video and graphics processing of the received video signal 103. For example, the input signal processing block may provide picture-in-picture (PIP) and/or split-screen functionalities for the display 102. After processing of the input video signal 103, a processed video signal 108 may be communicated to the display 102 for displaying and then to the noise reduction block 104.

The noise reduction block 104 may comprise suitable circuitry, logic, and/or code and may enable reducing noise within the processed video signal 108 received from the input signal processing block 101 and the display 102. The noise reduction block 104 may comprise one or more signal filters, for example, for reducing noise, such as block noise and/or mosquito noise. The noise reduction block 104 may generate an improved video signal 110, and communicate the improved video signal 110 to the display 106. The display 102 and the display 106 may be adapted to display the processed video signal 108 and the improved video signal 110, respectively. Accordingly, a viewer may compare the processed video signal 108 with the improved video signal 110 to determine a level of improvement.

In one embodiment of the invention, the exemplary system 100 for video signal processing may be implemented within a single television. In this regard, the display 102 and the display 106 may be implemented as a single display. For example, the display 102 may occupy a first portion of a television or monitor screen, and the display 106 may occupy at least a remaining portion of the television or monitor screen. In another exemplary embodiment of the invention, the display 106 may be presented as an inlay within the display 102.

In another embodiment of the invention, to further improve video processing demonstration performed by the exemplary system 100 for video signal processing, the system 100 may utilize circuitry for degrading one or more characteristics of the input video signal 103, prior to improving the signal and displaying the improved signal on display 106.

Figure 2:
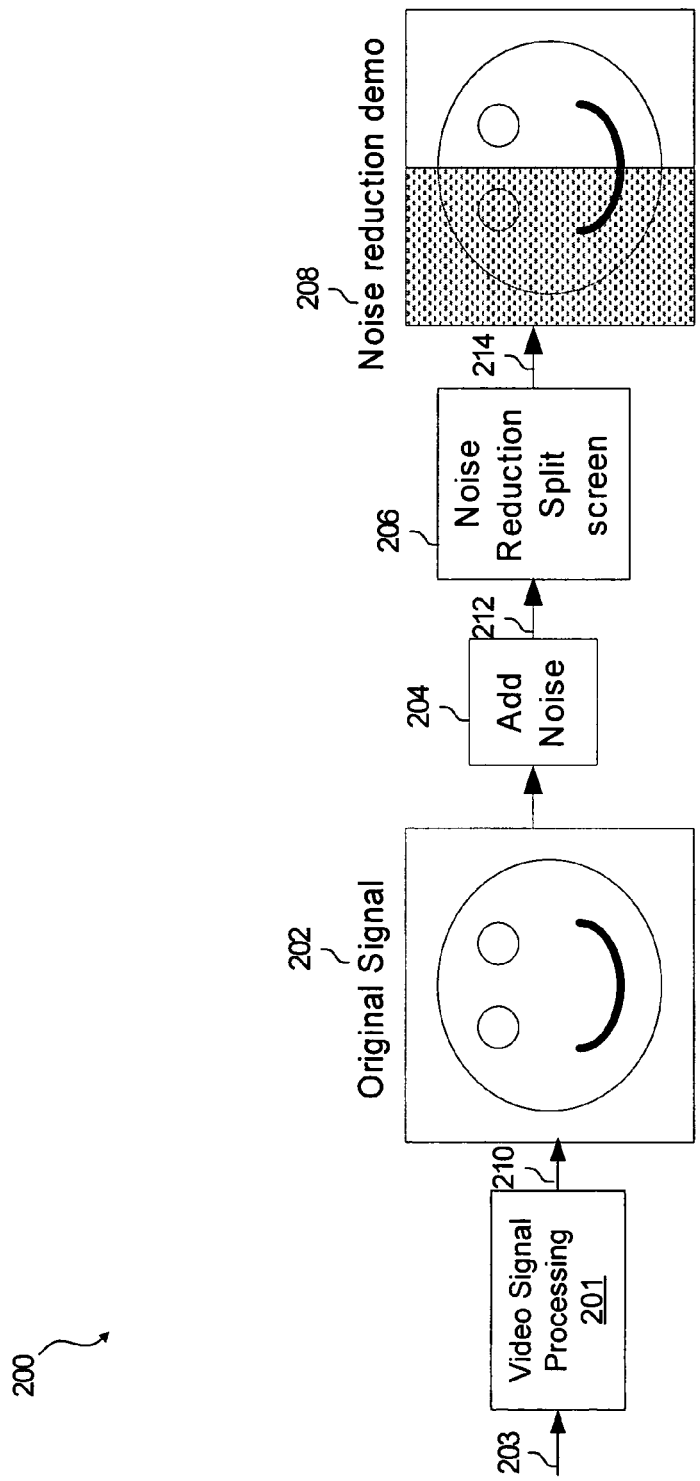
FIG. 2 is a block diagram of an exemplary system for video signal processing using noise reduction, in accordance with an embodiment of the invention.

FIG. 2 is a block diagram of an exemplary system for video signal processing using noise reduction, in accordance with an embodiment of the invention. Referring to FIG. 2, the exemplary system 200 for video signal processing may comprise an input signal processing block 201, displays 202 and 208, a noise signal degrading block 204, and a noise reduction block 206.

The input signal processing block 201 may comprise suitable circuitry, logic, and/or code and may enable initial processing of an input video signal 203. For example, the input signal processing block 201 may perform analog-to-digital conversion, demodulation, demultiplexing, and/or decoding of the received video signal 203. In addition, the input signal processing block 201 may enable additional video and graphics processing of the received video signal 203. For example, the input signal processing block may provide picture-in-picture (PIP) and/or split-screen functionalities for the display 202. After processing of the input video signal 203, a processed video signal 210 may be communicated to the display 202 for displaying and then to the noise signal degrading block 204.

The noise signal degrading block 204 may comprise suitable circuitry, logic, and/or code and may enable adding noise to the processed video signal 210. For example, the noise signal degrading block 204 may add block and/or mosquito noise to the processed video signal 210. In this regard, the noise signal degrading block 204 may add the noise by superimposing a pattern on the video signal 210 and/or by compressing and decompressing the video signal 210. The noise signal degrading block 204 may then communicate the degraded video signal 212 to the noise reduction block 206.

The noise reduction block 206 may comprise suitable circuitry, logic, and/or code and may enable reducing noise within the degraded video signal 212 received from the noise signal degrading block 204. The noise reduction block 206 may comprise one or more signal filters, for example, for reducing noise, such as block noise and/or mosquito noise. The noise reduction block 206 may generate an improved video signal 214 and may communicate the improved video signal 214 to the display 208. The display 202 may be adapted to display the processed video signal 210. The display 208 may be adapted to display a portion of the degraded video signal 212 and a corresponding portion of the improved video signal 214.

The display 208 may utilize PIP or split-screen functionalities and display at least a portion of the degraded video signal 212 and a corresponding portion of the improved video signal 214. Additionally, the display 208 may flash between displaying the degraded video signal 212 and the improved video signal 214. In this regard, video signal processing and signal improvement within the system 200 may be easily demonstrated, regardless of the condition of the input signal 203 and whether it is sufficiently degraded so that signal improvements within the system 200 may be visibly appreciated by a viewer, for example.

In one embodiment of the invention, the exemplary system 200 for video signal processing may be implemented within a single television set. In this regard, the display 202 and the display 208 may be implemented as a single display. In addition, the single display may enable a plurality of formats for displaying the degraded video signal 212 and the improved video signal 214. For example, the single display may alternate between displaying the degraded video signal 212 and the improved video signal 214, or the two signals may be displayed simultaneously, in a PIP or split-screen format, for example.

Figure 3:
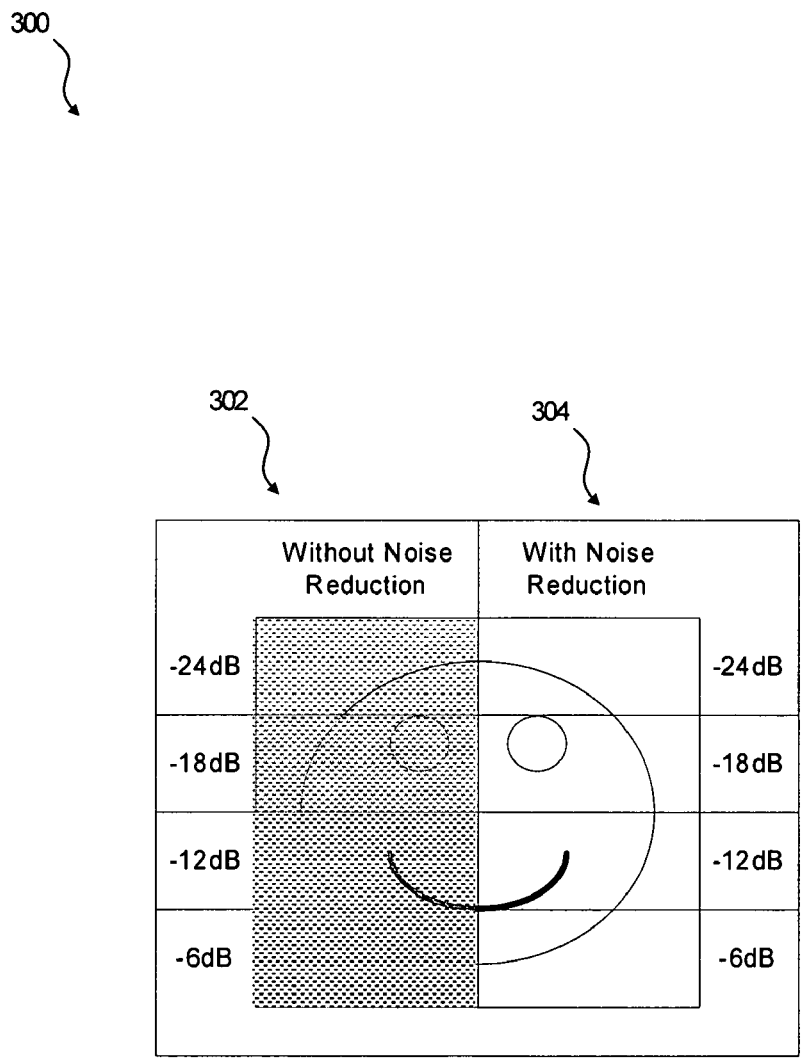
FIG. 3 is a block diagram of an exemplary split screen video capture, which may be used in accordance with an embodiment of the invention.

FIG. 3 is a block diagram of an exemplary split screen video capture, which may be used in accordance with an embodiment of the invention. Referring to FIGS. 2 and 3, the screen capture 300 may result from a split-screen video capture and may comprise video portions 302 and 304. Video portion 302 may comprise a portion of the degraded video signal 212, and video portion 304 may comprise a corresponding portion of the improved video signal 214.

In one embodiment of the invention, the noise signal degrading block 204 may utilize a plurality of different signal degrading steps, which may be displayed simultaneously as video portion 302. For example, the noise signal degrading block 204 may apply different levels of noise to the processed video signal 210, such as −6 dB, −12 dB, −18 dB, and/or −24 dB, for example, thereby generating a plurality of degraded video signals. In this regard, the plurality of degraded video signals may be displayed simultaneously within video portion 302. Corresponding improved video signals may be displayed in video portion 304.

Figure 4:
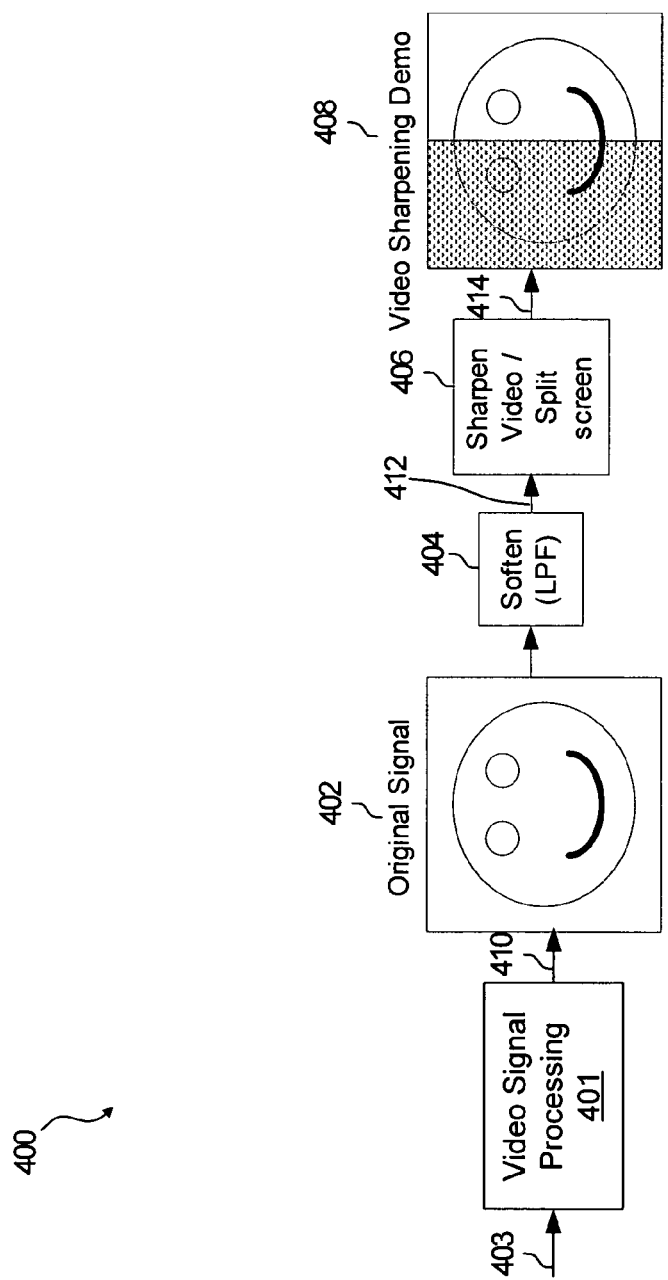
FIG. 4 is a block diagram of an exemplary system for video signal processing using video sharpening, in accordance with an embodiment of the invention.

FIG. 4 is a block diagram of an exemplary system for video signal processing using video sharpening, in accordance with an embodiment of the invention. Referring to FIG. 4, the exemplary system 400 for video signal processing may comprise an input signal processing block 401, displays 402 and 408, a video signal softening block 404, and a video signal sharpening block 406. The input signal processing block 401 and the displays 402 and 408 may be the same as the input signal processing block 201 and the displays 202 and 208 in FIG. 2.

The video signal softening block 404 may comprise suitable circuitry, logic, and/or code and may enable softening of the processed video signal 410. For example, the video signal softening block 404 may utilize a low-pass filter to soften the processed video signal 410 and generate the degraded video signal 412.

The video signal sharpening block 406 may comprise suitable circuitry, logic, and/or code and may enable sharpening of the degraded video signal 412 received from the video signal softening block 404. The video signal sharpening block 406 may generate an improved video signal 414 and may communicate the improved video signal 414 to the display 408. The display 408 may then display at least a portion of the degraded video signal 412 and at least a corresponding portion of the improved video signal 414.

Figure 5:
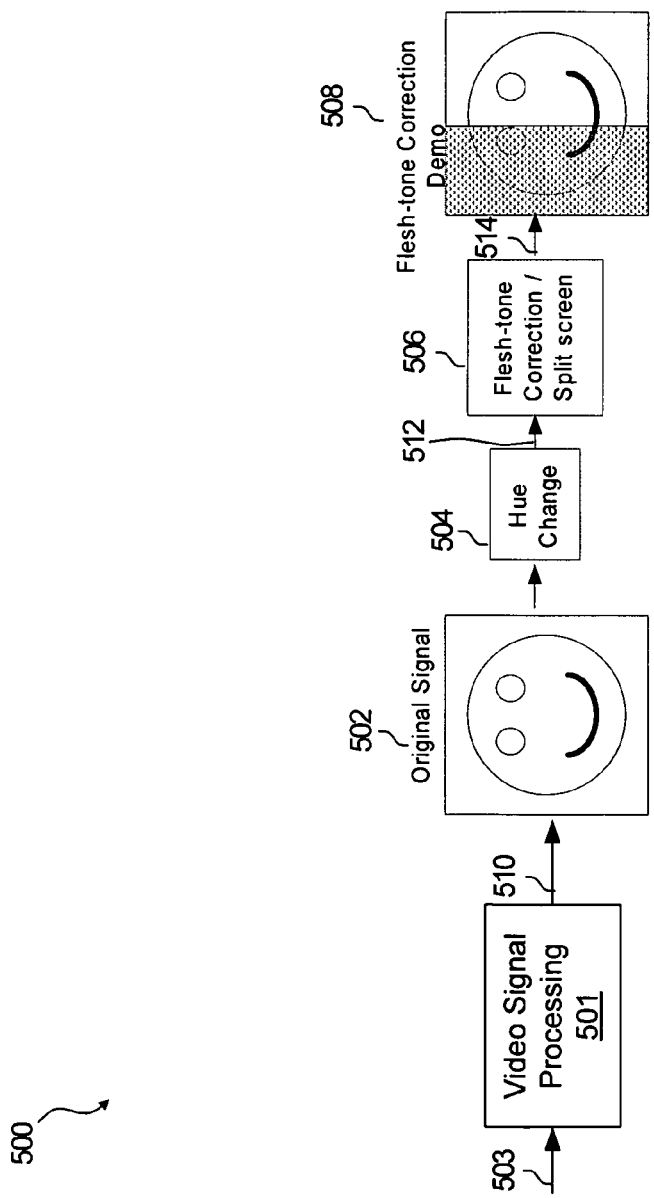
FIG. 5 is a block diagram of an exemplary system for video signal processing using flesh-tone correction, in accordance with an embodiment of the invention.

FIG. 5 is a block diagram of an exemplary system for video signal processing using flesh-tone correction, in accordance with an embodiment of the invention. Referring to FIG. 5, the exemplary system 500 for video signal processing may comprise an input signal processing block 501, displays 502 and 508, a video signal degrading block 504, and a flesh-tone correction block 506. The input signal processing block 501 and the displays 502 and 508 may be the same as the input signal processing block 201 and the displays 202 and 208 in FIG. 2.

The video signal degrading block 504 may comprise suitable circuitry, logic, and/or code and may enable detecting and corrupting flesh-tones within the processed video signal 510 to generate the degraded video signal 512. For example, the video signal degrading block 504 may corrupt flesh-tones within the processed video signal 510 by changing the hue of the processed video signal 510.

The flesh-tone correction block 506 may comprise suitable circuitry, logic, and/or code and may enable correction of flesh-tones within the degraded video signal 512 received from the video signal degrading block 504. The flesh-tone correction block 506 may generate an improved video signal 514 and may communicate the improved video signal 514 to the display 508. The display 508 may then display a portion of the degraded video signal 512 and a corresponding portion of the improved video signal 514.

Figure 6:
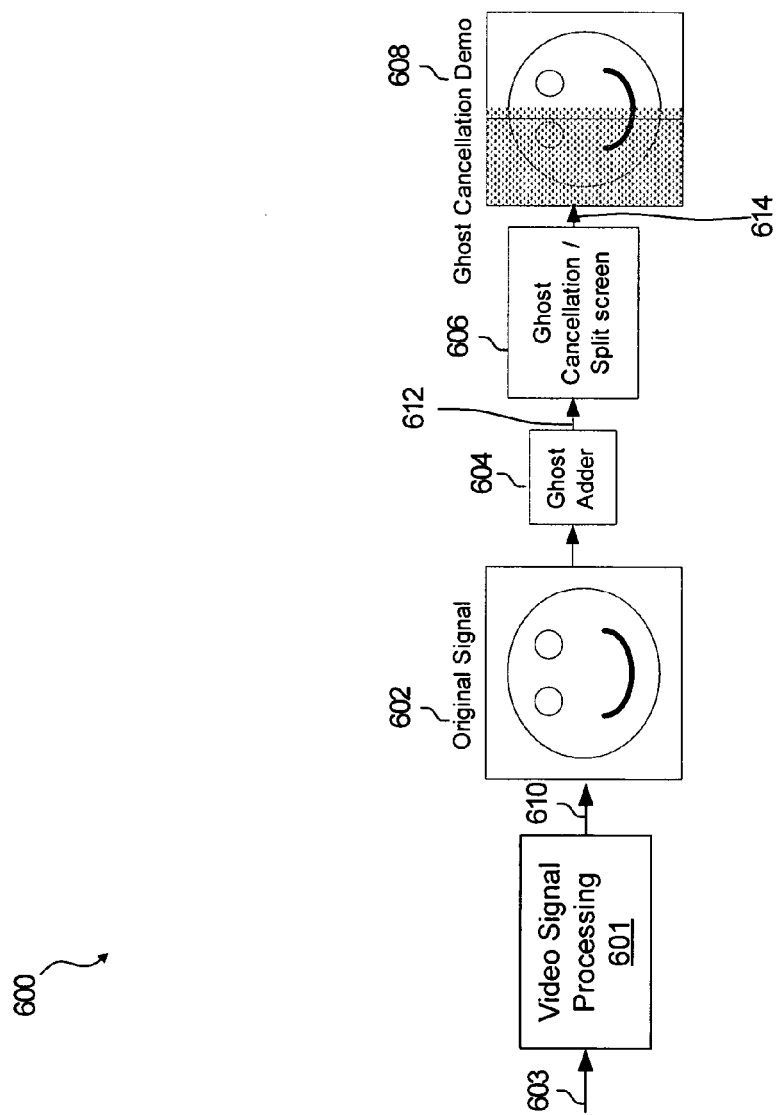
FIG. 6 is a block diagram of an exemplary system for video signal processing using ghost cancellation, in accordance with an embodiment of the invention.

FIG. 6 is a block diagram of an exemplary system for video signal processing using ghost cancellation, in accordance with an embodiment of the invention. Referring to FIG. 6, the exemplary system 600 for video signal processing may comprise an input signal processing block 601, displays 602 and 608, a ghost adding block 604, and a ghost correction block 606. The input signal processing block 601 and the displays 602 and 608 may be the same as the input signal processing block 201 and the displays 202 and 208 in FIG. 2.

The ghost adding block 604 may comprise suitable circuitry, logic, and/or code and may enable adding of ghost signals within the processed video signal 610 to generate the degraded video signal 612. The ghost correction block 606 may comprise suitable circuitry, logic, and/or code and may enable correction of added ghost signals within the degraded video signal 612 received from the ghost adding block 604. The ghost correction block 606 may generate an improved video signal 614 and may communicate the improved video signal 614 to the display 608. The display 608 may then display at least a portion of the degraded video signal 612 and at least a corresponding portion of the improved video signal 614.

Even though the present invention discloses adding of noise, signal sharpening, hue changing, and ghost adding as signal distortion, the present invention may not be so limited. In this regard, other signal distortion methods and techniques may also be utilized to achieve video processing demonstration. Additionally, one or more distortion techniques may be applied to an input video signal and video processing and signal improvement with regard to the plurality of distortions that may be used to degrade the input signal.

Figure 7:
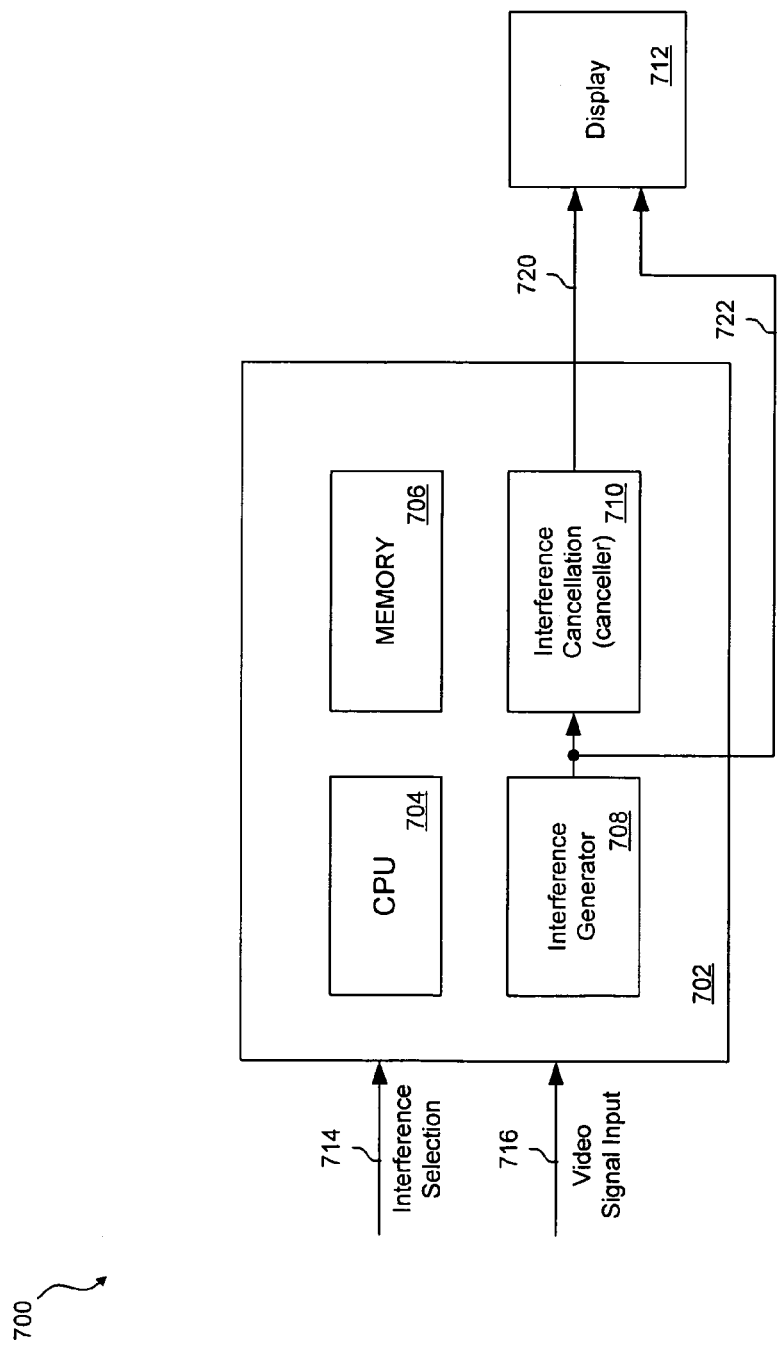
FIG. 7 is a block diagram of an exemplary system for video signal processing, in accordance with an embodiment of the invention.

FIG. 7 is a block diagram of an exemplary system for video signal processing, in accordance with an embodiment of the invention. Referring to FIG. 7, the system 700 may comprise a video signal processing block 702 and a display 712. The video signal processing block 702 may comprise a CPU 704, memory 706, interference generator block 708, and interference cancellation block 710. The video signal processing block 702 and the display 712 may be implemented within a single television set, for example.

The interference generator block 708 may comprise suitable circuitry, logic, and/or code and may enable generation of an interference signal and addition of the generated interference signal to the video signal input 716. For example, the interference generator block 708 may enable adding of block noise and/or mosquito noise, softening of the video signal input 716, corrupting of flesh-tones within the video signal input 716, and/or adding of ghost signals within the video signal input 716. A degraded video signal 722, generated by the interference generator block 708, may be communicated to the interference cancellation block 710 and/or to the display 712.

In one embodiment of the invention, the interference generator block 708 may enable generation of any other kind of interference signals, which may be added to the video signal input 716 to generate the degraded video signal 722. Furthermore, an interference selection signal 714 that may be communicated by a user, for example, may be utilized for selecting the application of one or more interference signals to the video signal input 716 to generate the degraded video signal 722.

The interference cancellation block 710 may comprise suitable circuitry, logic, and/or code and may enable canceling one or more signal interferences within the degraded video signal 722 received from the interference generator block 708. In this regard, the interference cancellation block 710 may generate an improved video signal 720 and may communicate the improved video signal 720 to the display 712. The display 712 may utilize PIP or split-screen functionalities and display at least a portion of the degraded video signal 722 and at least a corresponding portion of the improved video signal 720. Additionally, the display 712 may flash between displaying the degraded video signal 722 and the improved video signal 720.

In another embodiment of the invention, the system 700 for processing a video signal may comprise at least one processor, such as interference generator 708 that enables degrading of a received video signal 716 utilizing one or more of a plurality of video signal degrading methods. The interference canceller 710 may enable processing of the degraded video signal 722 to generate an improved video signal 720. The interference generator 708 may enable displaying of at least a portion of the degraded video signal 722 and a corresponding portion of the improved video signal 720 on the display 712. The interference canceller 710 may enable adding of random noise to the received video signal 716 to generate the degraded video signal 722. The CPU 704 may enable reduction of noise within the degraded video signal 722 to generate the improved video signal 720 utilizing digital noise reduction and/or analog noise reduction.

The interference generator 708 may enable compression and decompression of the received video signal 716 to generate the random noise and may also enable softening of the received video signal 716 to generate the degraded video signal 722. The interference canceller 710 may enable sharpening of the degraded video signal 722 to generate the improved video signal 720. The interference generator 708 may enable corrupting of flesh-tones within the received video signal 716 to generate the degraded video signal 722. The interference canceller 710 may enable correction of at least a portion of the corrupted flesh-tones within the degraded video signal 722 to generate the improved video signal 720. The interference generator 708 may enable adding of ghost signals within the received video signal 716 to generate the degraded video signal 722. The interference canceller 710 may enable cancellation of at least a portion of the added ghost signals within the degraded video signal 722 to generate the improved video signal 720.

Figure 8:
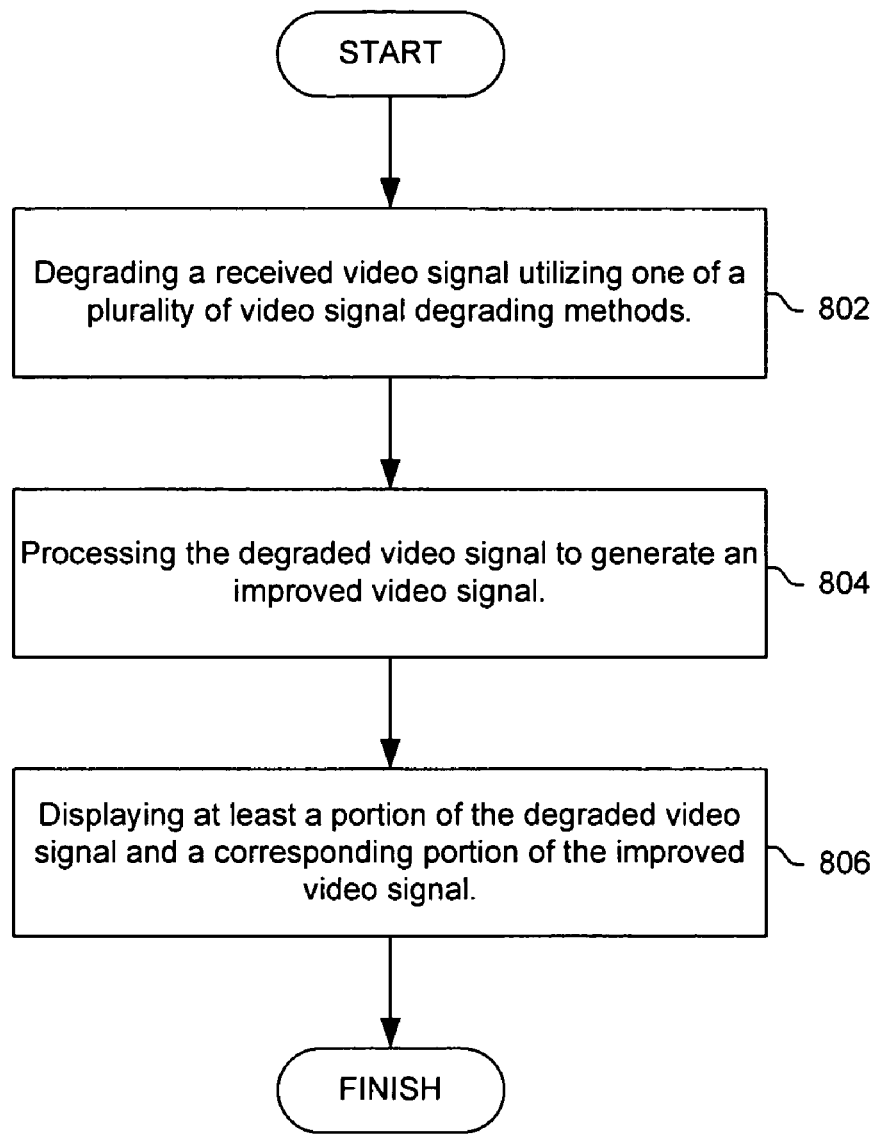
FIG. 8 is a flow diagram illustrating exemplary steps that may be utilized for processing video signals, in accordance with an embodiment of the invention.

FIG. 8 is a flow diagram illustrating exemplary steps that may be utilized for processing video signals, in accordance with an embodiment of the invention. Referring to FIGS. 7 and 8, at 802, a received video signal 716 may be degraded by the interference generator block 708 utilizing one or more of a plurality of video degrading methods. At 804, the degraded video signal 722 may be processed by the interference cancellation block 710 to generate an improved video signal 720. At 806, at least a portion of the degraded video signal 722 and a corresponding portion of the improved video signal 720 may be displayed by the display 712.

Another embodiment of the invention may provide a machine-readable storage having stored thereon, a computer program having at least one code section for processing video signals, the at least one code section being executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing a video signal, the method comprising:
   degrading a received video signal utilizing one or more of a plurality of video signal degrading methods;
   processing said degraded video signal to generate an improved video signal;
   displaying at least a portion of said degraded video signal and a corresponding portion of said improved video signal;
   softening said received video signal to generate said degraded video signal; and
   sharpening said degraded video signal to generate said improved video signal.

2. A method for processing a video signal, the method comprising:
   degrading a received video signal utilizing one or more of a plurality of video signal degrading methods;
   processing said degraded video signal to generate an improved video signal;
   displaying at least a portion of said degraded video signal and a corresponding portion of said improved video signal; and
   corrupting flesh-tones within said received video signal to generate said degraded video signal.

3. A method for processing a video signal, the method comprising:
   degrading a received video signal utilizing one or more of a plurality of video signal degrading methods;
   processing said degraded video signal to generate an improved video signal;
   displaying at least a portion of said degraded video signal and a corresponding portion of said improved video signal;
   corrupting flesh-tones within said received video signal to generate said degraded video signal; and
   correcting at least a portion of said corrupted flesh-tones within said degraded video signal to generate said improved video signal.

4. A system for processing a video signal, the system comprising:
   at least one processor that enables degrading of a received video signal utilizing one or more of a plurality of video signal degrading methods;
   said at least one processor enables processing of said degraded video signal to generate an improved video signal; and
   said at least one processor enables displaying of at least a portion of said degraded video signal and a corresponding portion of said improved video signal, wherein said at least one processor enables softening of said received video signal to generate said degraded video signal, and wherein said at least one processor enables sharpening of said degraded video signal to generate said improved video signal.

5. A system for processing a video signal, the system comprising:
   at least one processor that enables degrading of a received video signal utilizing one or more of a plurality of video signal degrading methods;
   said at least one processor enables processing of said degraded video signal to generate an improved video signal; and
   said at least one processor enables displaying of at least a portion of said degraded video signal and a corresponding portion of said improved video signal, wherein said at least one processor enables corrupting of flesh-tones within said received video signal to generate said degraded video signal.

6. A system for processing a video signal, the system comprising:
   at least one processor that enables degrading of a received video signal utilizing one or more of a plurality of video signal degrading methods;
   said at least one processor enables processing of said degraded video signal to generate an improved video signal; and
   said at least one processor enables displaying of at least a portion of said degraded video signal and a corresponding portion of said improved video signal, wherein said at least one processor enables corrupting of flesh-tones within said received video signal to generate said degraded video signal, and wherein said at least one processor enables correction of at least a portion of said corrupted flesh-tones within said degraded video signal to generate said improved video signal.

* * * * *